United States Patent
Ishi (10) Patent No.: US 8,979,440 B2
(45) Date of Patent: Mar. 17, 2015

(54) CUTTING INSERT, CUTTING TOOL, AND METHOD OF MANUFACTURING MACHINED PRODUCT USING THEM

(75) Inventor: Hirohisa Ishi, Moriyama (JP)

(73) Assignee: Kyocera Corporation, Kyoto (JP)

( * ) Notice: Subject to any disclaimer, the term of this patent is extended or adjusted under 35 U.S.C. 154(b) by 272 days.

(21) Appl. No.: 13/809,022

(22) PCT Filed: Sep. 15, 2011

(86) PCT No.: PCT/JP2011/071076
§ 371 (c)(1),
(2), (4) Date: Jan. 8, 2013

(87) PCT Pub. No.: WO2012/046556
PCT Pub. Date: Apr. 12, 2012

(65) Prior Publication Data
US 2013/0108388 A1 May 2, 2013

(30) Foreign Application Priority Data

Oct. 5, 2010 (JP) .................................. 2010-225356

(51) Int. Cl.
*B23C 5/06* (2006.01)
*B23C 5/20* (2006.01)
(Continued)

(52) U.S. Cl.
CPC ................ *B23C 5/207* (2013.01); *B23C 5/109* (2013.01); *B23C 5/205* (2013.01); *B23C 2200/085* (2013.01); *B23C 2200/286* (2013.01)
USPC .............................. 407/113; 407/42; 407/114

(58) Field of Classification Search
USPC ............................. 407/113, 114, 115, 116, 42
See application file for complete search history.

(56) References Cited

U.S. PATENT DOCUMENTS

| 6,074,137 A | 6/2000 | Betman et al. |
| 6,872,034 B2 | 3/2005 | Satran et al. |

(Continued)

FOREIGN PATENT DOCUMENTS

| JP | 1990-053303 U | 4/1990 |
| JP | 253303 | 4/1990 |

(Continued)

*Primary Examiner* — Will Fridie, Jr.
(74) *Attorney, Agent, or Firm* — Volpe and Koenig, P.C.

(57) ABSTRACT

A cutting insert includes an upper surface; a lower surface; a side surface which is connected to each of the upper surface and the lower surface and includes a first side surface, a second side surface and a third side surface being adjacent to each other in order; an upper cutting edge including an upper major cutting edge located at an intersection of the upper surface and the first side surface, and an upper flat cutting edge located closer to the upper major cutting edge in an intersection of the upper surface and the second side surface; and a lower cutting edge including a lower major cutting edge located at an intersection of the lower surface and the third side surface, and a lower flat cutting edge located closer to the lower major cutting edge in an intersection of the lower surface and the second side surface. The second side surface comprises an upper flank surface connected to the upper flat cutting edge, and a lower flank surface connected to the lower flat cutting edge. As going from the upper surface to the lower surface, the upper flank surface is closer to a central axis extending between the upper surface and the lower surface and the lower flank surface is separated from the central axis in a side sectional view. A cutting tool including the cutting insert, and a method of manufacturing a machined product by using the cutting tool are also provided.

18 Claims, 6 Drawing Sheets

(51) Int. Cl.
*B23C 5/10* (2006.01)
*B23C 5/16* (2006.01)

(56) References Cited

U.S. PATENT DOCUMENTS

| | | | |
|---|---|---|---|
| 6,921,233 B2 | 7/2005 | Duerr et al. | |
| 8,475,090 B2 * | 7/2013 | Mergenthaler et al. | 408/1 R |
| 8,579,558 B2 * | 11/2013 | Hatta | 409/132 |
| 2004/0208713 A1 | 10/2004 | Duerr et al. | |
| 2005/0042044 A1 | 2/2005 | Satran et al. | |
| 2005/0169716 A1 * | 8/2005 | Smilovici et al. | 407/113 |
| 2005/0214081 A1 * | 9/2005 | Satran et al. | 407/113 |
| 2006/0045636 A1 | 3/2006 | Johnson et al. | |
| 2006/0147279 A1 | 7/2006 | Satran et al. | |
| 2006/0257214 A1 | 11/2006 | Johnson et al. | |
| 2012/0155976 A1 * | 6/2012 | Ishi | 407/33 |
| 2012/0275868 A1 * | 11/2012 | Saito et al. | 407/42 |
| 2014/0298967 A1 * | 10/2014 | Ishi | 83/13 |

FOREIGN PATENT DOCUMENTS

| | | |
|---|---|---|
| JP | 2001-509087 | 7/2001 |
| JP | 2004-284010 | 10/2004 |
| JP | 2005-528230 | 9/2005 |
| JP | 2007-520360 | 7/2007 |
| JP | 2008-511464 | 4/2008 |
| JP | 2008-229745 | 10/2008 |
| WO | WO 98/24578 | 6/1998 |
| WO | WO 03/101655 | 12/2003 |
| WO | WO 2004/050283 | 6/2004 |
| WO | WO 2005/075135 | 8/2005 |

* cited by examiner

CUTTING INSERT, CUTTING TOOL, AND METHOD OF MANUFACTURING MACHINED PRODUCT USING THEM

TECHNICAL FIELD

The present invention relates to a cutting insert, a cutting tool, and a method of manufacturing a machined product using them.

BACKGROUND ART

As an example of cutting inserts, Japanese Unexamined Patent Publication No. 2004-284010 discloses a reversible cut insert having a rectangular shape in a top view. The cut insert has a structure in which a basal body is twisted around two axial lines.

However, when an attempt is made to ensure a large axial rake angle of a cutting edge in the foregoing cut insert, it is necessary to decrease a forward inclination angle of the cut insert. This makes it difficult to ensure a sufficient clearance angle between a flank surface and a workpiece during a cutting process. Consequently, frictional heat generation occurs due to contact between the flank surface and the workpiece, and there is a risk of early wear of the cut insert.

SUMMARY OF THE INVENTION

An object of the present invention is to provide a cutting insert and a cutting tool which are configured to reduce contact between a flank surface closer to a flat cutting edge and a workpiece while decreasing cutting resistance exerted on a major cutting edge, and a method of manufacturing a machined product using the cutting insert and the cutting tool.

A cutting insert according to an embodiment of the present invention includes (i) an upper surface, (ii) a lower surface, (iii) a side surface which is connected to each of the upper surface and the lower surface and includes a first side surface, a second side surface and a third side surface being adjacent to each other in order, (iv) an upper cutting edge including an upper major cutting edge located at an intersection of the upper surface and the first side surface, and an upper flat cutting edge located closer to the upper major cutting edge in an intersection of the upper surface and the second side surface, and (v) a lower cutting edge including a lower major cutting edge located at an intersection of the lower surface and the third side surface, and a lower flat cutting edge located closer to the lower major cutting edge in an intersection of the lower surface and the second side surface. The second side surface includes an upper flank surface connected to the upper flat cutting edge, and a lower flank surface connected to the lower flat cutting edge. As going from the upper surface to the lower surface, the upper flank surface is closer to a central axis extending between the upper surface and the lower surface and the lower flank surface is separated from the central axis in a side sectional view.

A cutting tool according to an embodiment of the present invention includes the foregoing cutting insert, and a holder configured to attach the cutting insert thereto. An inclination angle θ2 between a straight line perpendicular to a rotation axis of the holder and the upper flank surface is larger than an inclination angle θ3 between the rotation axis of the holder and a straight line perpendicular to the central axis of the cutting insert in a side view.

A method of manufacturing a machined product according to an embodiment of the present invention includes rotating the foregoing cutting tool; bringing the upper cutting edge of the cutting tool being rotated into contact against a workpiece; and separating the cutting tool from the workpiece.

In the cutting insert according to the embodiment of the present invention, the upper flank surface of the second side surface is closer to the central axis extending between the upper surface and the lower surface, and the lower flank surface of the second side surface is separated from the central axis as the upper and lower flank surfaces respectively go from the upper surface to the lower surface in the side sectional view. Therefore, a relatively large clearance angle between a finished surface of the workpiece and the individual flank surfaces of the second side surface can be ensured without largely tilting forward the cutting insert toward a travel direction (forward) in the rotation direction of the holder. Additionally, because the second side surface includes the two flank surfaces, namely, the upper flank surface and the lower flank surface inclined in different directions to each other, the foregoing effect can also be produced even when the cutting insert is attached to the holder in a state in which either one of the upper surface and the lower surface is oriented toward the travel direction in the rotation direction of the holder. On the other hand, there is no need to largely tilt forward the cutting insert in order to ensure a relatively large clearance angle, thereby making it possible to ensure a relatively large axial rake angle of the upper major cutting edge. In other words, the cutting resistance can be reduced while ensuring that the upper major cutting edge of the cutting insert has a relatively small inclination. It is therefore not necessary to increase the thickness of the cutting insert any more than it is necessary to ensure a desired strength thereof. This produces an advantage of reducing material costs.

PREFERRED EMBODIMENTS FOR CARRYING OUT THE INVENTION

<Cutting Insert>

A cutting insert (hereinafter referred to as "insert" in some cases) according to an embodiment of the present invention is described in details below with reference to FIGS. 1 to 3.

Figure 1A:
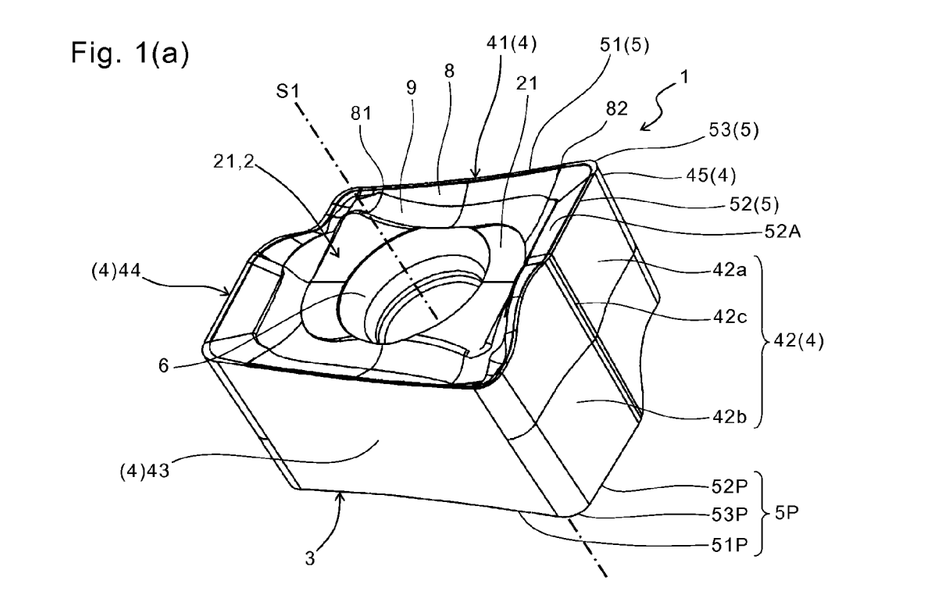
FIG. 1(a) is a perspective view showing a cutting insert according to an embodiment of the present invention.
Figure 1B:
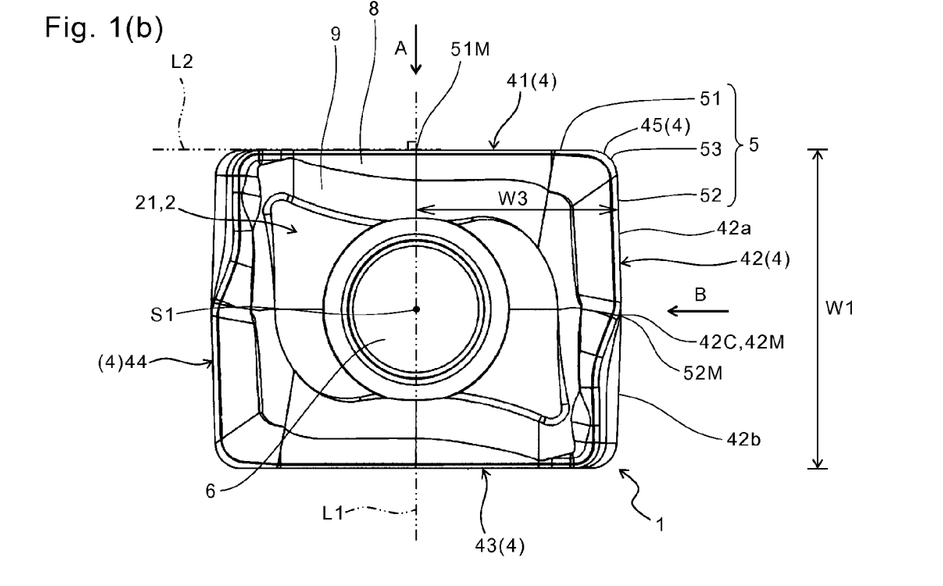
FIG. 1(b) is a plan view (top plan view) thereof.
Figures 2A, 2B:
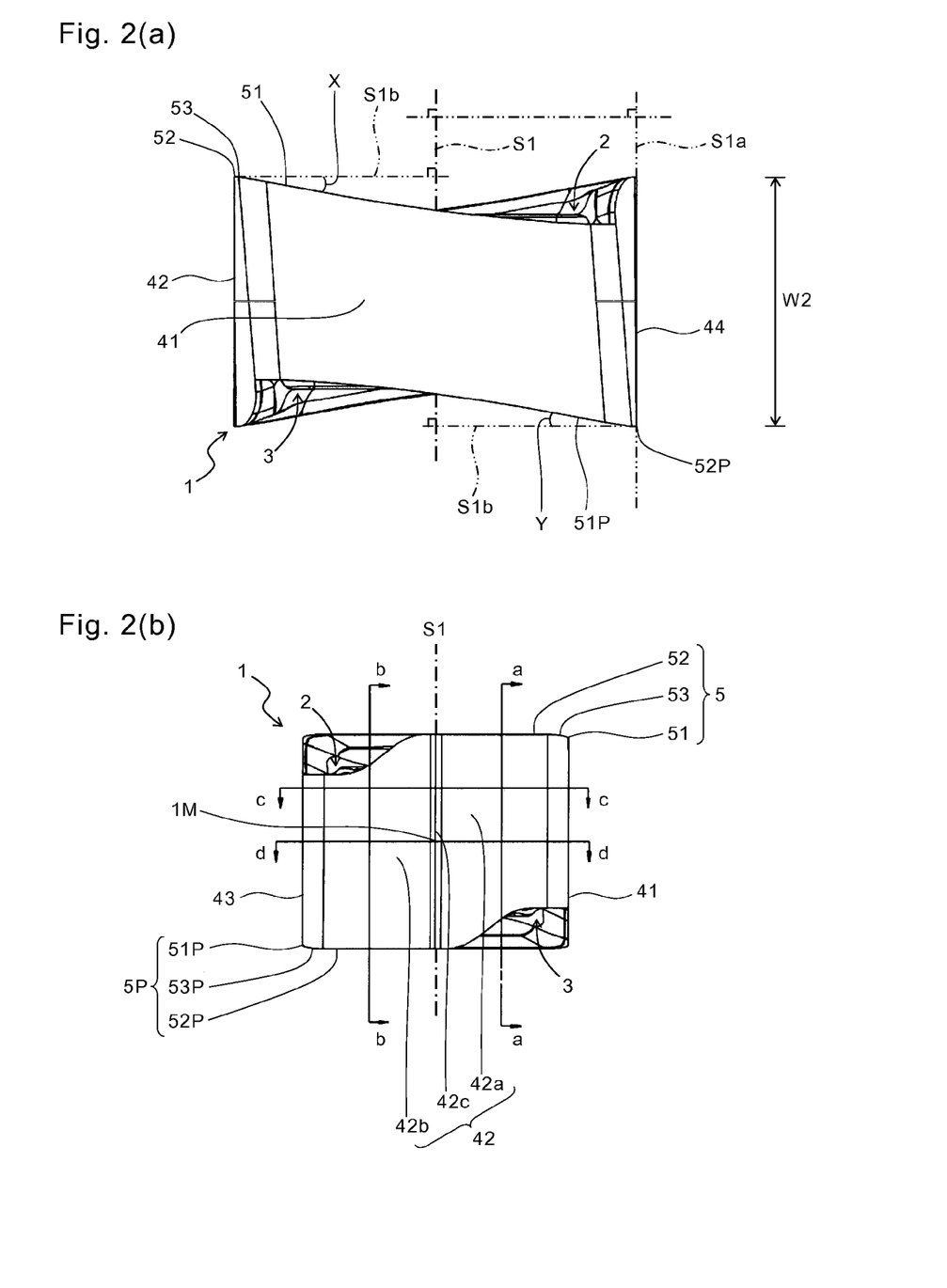
FIG. 2(a) is a side view of the cutting insert in FIG. 1, taken from a first side surface as indicated by arrow A in FIG. 1(b)
FIG. 2(b) is a side view thereof, taken from a second side surface as indicated by arrow B in FIG. 1(b)

As shown in FIGS. 1 and 2, the insert 1 of the present embodiment generally includes an upper surface 2, a lower surface 3, a side surface 4 connected to each of the upper surface 2 and the lower surface 3, a through hole 6 extending between the upper surface 2 and the lower surface 3, an upper cutting edge 5 located at an intersection of the upper surface 2 and the side surface 4, and a lower cutting edge 5P located at an intersection of the lower surface 3 and the side surface 4.

The side surface 4 includes a first side surface 41, a second side surface 42, a third side surface 43 and a fourth side surface 44 which are adjacent to each other in order. As shown in FIG. 1(b), the insert 1 has a rectangular shape (quadrangular shape) whose long side is an outer edge of the insert 1 closer to the first side surface 41 and whose short side is an outer edge of the insert 1 closer to the second side surface 42 in a top view. Therefore, the third side surface 43 forming a pair with the first side surface 41 is located opposite the first side surface 41, and the fourth side surface 44 forming a pair with the second side surface 42 is located opposite the second side surface 42. The third side surface 43 and the fourth side surface 44 are identical in structure to the first side surface 41 and the second side surface 42, respectively. Therefore, only the first side surface 41 and the second side surface 42 are described below, and descriptions of the third side surface 43 and the fourth side surface 44 are omitted in the following unless a special explanation is required. In the present specification, the phrase "top view" denotes a state in which the insert 1 is viewed from the upper surface 2 unless otherwise stated.

In the insert 1 of the present embodiment, a distance W1 (width) from the first side surface 41 to the third side surface 43 in the top view shown in FIG. 1(b) is larger than a distance W2 (thickness) from the upper surface 2 to the lower surface 3 in the side view shown in FIG. 2(a). That is, the insert 1 of the present embodiment is a so-called horizontal insert 1. Accordingly, the width of the insert 1 is relatively large, and it is capable of imparting desired size and shape to later-described rake surface 8 and raised surface 9, thus improving chip discharge performance.

With regard to the size of the insert 1, for example, the long side of the substantially rectangular shape is preferably about 6 to 30 mm, and the short side is preferably about 4 to 16 mm in a top view. A thickness from the upper surface 2 to the lower surface 3 is preferably about 3 to 7 mm. The term "thickness" denotes a line segment parallel to a central axis S1 of the insert 1 in a distance between a region of the upper surface 2 located uppermost and a region of the lower surface 3 located lowermost in a side view, unless otherwise noted in the following. The phrase "side view" denotes a state in which the insert 1 is viewed toward the first side surface 41, unless otherwise noted in the present specification. The phrase "central axis S1 of the inert 1" denotes an axis which extends between the upper surface 2 and the lower surface 3, and serves as a rotation axis when the insert 1 is rotated in a top view.

The insert 1 can be formed using a hard material, such as cemented carbide, ceramics or cermet, or, alternatively those in which a hard film of TiC, TiN, TiCN, or $Al_2O_3$ is coated on each of these base materials by means of PVD or CVD. It is preferable to use those in which PVD coating is applied to cemented carbide, from the viewpoint of chipping resistance and stability of the coating layer.

The individual elements of the insert 1 are described sequentially below. Firstly, the upper cutting edge 5 is located at the intersection of the upper surface 2 and the side surface 4 as described above, and includes an upper major cutting edge 51 and an upper flat cutting edge 52. The upper major cutting edge 51 is located at an intersection of the upper surface 2 and the first side surface 41. The upper flat cutting edge 52 is located closer to the upper major cutting edge 51 in an intersection of the upper surface 2 and the second side surface 42. Thus in the present embodiment, a region of the side surface 4 configured to form the upper major cutting edge 51, and a region of the side surface 4 configured to form the upper flat cutting edge 52 are separated from each other, namely, the first side surface 41 and the second side surface 42. This makes it relatively easy to design the upper major cutting edge 51, the rake surface 8 and the raised surface 9 which extend along the upper major cutting edge 51, and are located on the upper surface 2, and a later-described upper flank surface 42a opposing the upper flat cutting edge 52 so as to have configurations suitable for their respective roles.

Further in the present embodiment, the upper major cutting edge 51 and the upper flat cutting edge 52 are connected to each other with an upper corner cutting edge 53 interposed therebetween. The insert 1 of the present embodiment can perform a cutting process using a corner including the upper major cutting edge 51, the upper flat cutting edge 52 and the upper corner cutting edge 53.

Figure 4A:
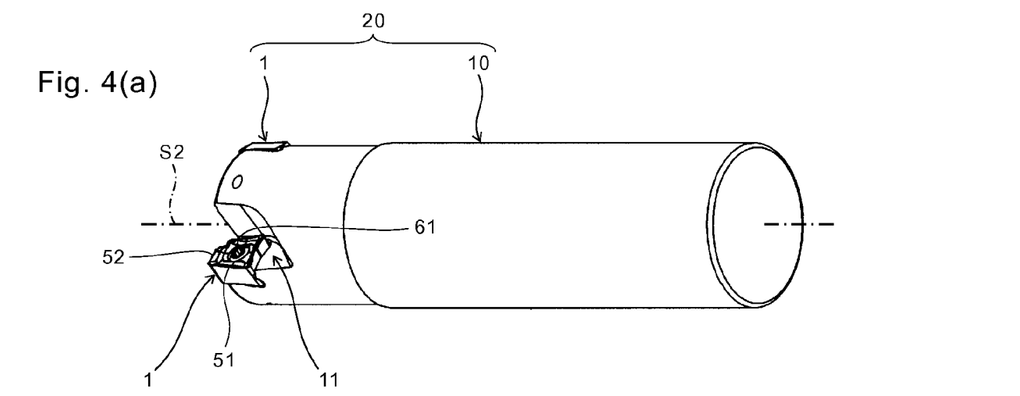
FIG. 4(a) is a perspective view showing a cutting tool according to an embodiment of the present invention.

As described above, the insert 1 also includes the lower cutting edge 5P at the intersection of the lower surface 3 and the side surface 4 similarly to the upper surface 2 side, as shown in FIG. 1(a). Similarly to the upper cutting edge 5, the lower cutting edge 5P includes a lower major cutting edge 51P, a lower flat cutting edge 52P, and a lower corner cutting edge 53P connecting these two cutting edges. When the cutting process is performed using the lower major cutting edge 51P, a later-described flat surface 21 of the upper surface 2 can be used as a seating surface with respect to the holder 10 shown in FIG. 4. That is, the insert 1 of the present embodiment allows each of the upper surface 2 and the lower surface 3 to be used for the cutting process. Therefore, the lower major cutting edge 51P closer to the lower surface 3 has a shape obtained by reversing the upper major cutting edge 51 closer to the upper surface 2 so that the insert 1 can also be used by turning it upside down.

The upper cutting edge 5 and the lower cutting edge 5P have the same configuration except that the upper and lower surfaces are upside down. The following explanation of the upper cutting edge 5 is true for the lower cutting edge 5P unless a special explanation is required. This is also true for other configurations. That is, the upper cutting edge 5 and the lower cutting edge 5P have rotational symmetry around an axis which is a line perpendicular to the paper surface of FIG. 2(b), and passes through a middle point 1M of the width and thickness of the insert 1. Hence, the insert 1 of the present embodiment can perform the cutting process using a total of four corners, two on each of the upper surface 2 and the lower surface 3.

Figure 6A:
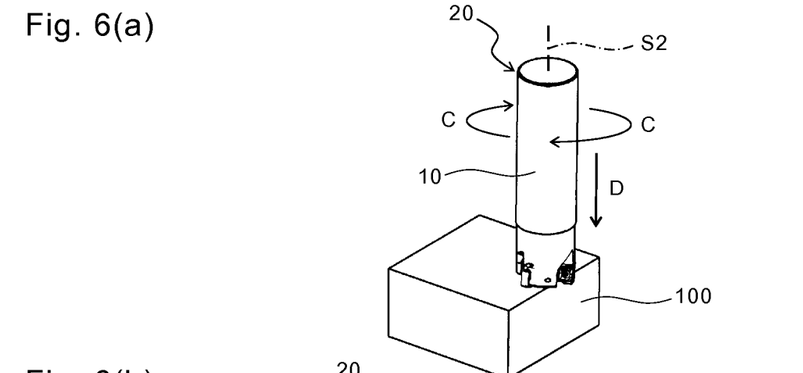
FIGS. 6(a) to 6(c) are perspective views showing a method of manufacturing a machined product according to an embodiment of the present invention in manufacturing step order.

On the other hand, the upper major cutting edge 51 of the upper cutting edge 5 of the present embodiment is located at the intersection of the upper surface 2 and the first side surface 41 as described above, and performs a major role in chip generation during cutting action. The upper major cutting edge 51 has a gentle outward convex-shaped curve as the upper major cutting edge 51 separates from the upper flat cutting edge 52 in a top view, as shown in FIG. 1(b). The upper major cutting edge 51 is also inclined in a gentle downward concave-shaped curve as the upper major cutting edge 51 separates from the upper flat cutting edge 52 in a side view, as shown in FIG. 2(a). Owing to the former configuration, a rotation track of the upper major cutting edge 51 attached to the holder 10 during the cutting process can draw an identical cylindrical surface, thereby improving smoothness of an outer peripheral machined surface of the workpiece 100 shown in FIG. 6. The latter configuration allows for a reduction of cutting resistance exerted on the upper major cutting edge 51 during the cutting process.

As shown in FIG. 2(a), the upper major cutting edge 51 is inclined downward at an inclination angle X as the upper major cutting edge 51 separates from the upper flat cutting edge 52 in a side view. The inclination angle X is gradually decreased as separating from the upper flat cutting edge 52. Similarly, as shown in FIG. 2(a), the lower major cutting edge 51P is inclined upward at an inclination angle Y as the lower major cutting edge 51P separates from the lower flat cutting edge 52P in a side view. The inclination angle Y is gradually decreased as separating from the lower flat cutting edge 52P. Hereat, the inclination angles X and Y denote inclination angles with respect to a reference line S1b perpendicular to the central axis S1.

The upper flat cutting edge 52 is located closer to the upper major cutting edge 51 in the intersection of the upper surface 2 and the second side surface 42 as described above, and has a role of smoothing the finished surface 102 of the workpiece 100 shown in FIG. 6. In the present embodiment, a region of the intersection of the upper surface 2 and the second side surface 42, which extends from an end portion thereof closer to the upper major cutting edge 51 (upper corner cutting edge 53) to a middle portion thereof, is mainly used as the upper flat cutting edge 52 during the cutting process.

Also in the present embodiment, the upper flat cutting edge 52 has a straight line shape, and is substantially perpendicular to the central axis S1, as shown in FIGS. 1(b) and 2(b). Alternatively, in addition to being substantially perpendicular to the central axis S1, the upper flat cutting edge 52 may be set to have a slight inclination with respect to the central axis S1, from the viewpoint of obtaining luster by improving the surface roughness of the finished surface 102 of the workpiece 100. As a specific example, the upper flat cutting edge 52 preferably includes a region where a distance W3 from a reference line L1, which passes through the central axis S1 and is orthogonal to a tangential line L2 at a middle point 51M of the upper major cutting edge 51, is increased from the first side surface 41 to the third side surface 43, as shown in FIG. 1(b). That is, the upper flat cutting edge 52 is configured to bulge outward from the first side surface 41 to the third side surface 43. The distance W3 from the reference line L1 reaches a maximum value at a middle region 52M in the intersection of the upper surface 2 and the second side surface 42.

The upper corner cutter edge 53 is sandwiched between the upper major cutting edge 51 and the upper flat cutting edge 52 as shown in FIG. 1(b), and is in the shape of an outward convex curve in a top view. The upper corner cutting edge 53 has a role in reducing fracture at the intersection of the upper major cutting edge 51 and the upper flat cutting edge 52.

As shown in FIG. 1(a), the upper surface 2 includes the rake surface 8 and the flat surface 21. The rake surface 8 is located along the upper major cutting edge 51, and is inclined downward as the upper surface 2 separates from the upper major cutting edge 51. The flat surface 21 is located at least partially above the upper major cutting edge 51 in a side view, in a region of the upper surface 2 which is located around the through hole 6, and is separated from the upper major cutting edge 51. In the present embodiment, the upper surface 2 and the lower surface 3 have the same configuration, and therefore the description of the lower surface 3 is omitted in the following unless a special explanation is required.

The rake surface 8 has a role in smoothly discharging to the exterior the chips generated by the upper major cutting edge 51 during the cutting process by being contacted against the chips so as to cause deformation of the chips or change their flow direction. The rake surface 8 may be continuous with the upper major cutting edge 51, or may be disposed via a so-called land (land surface). Alternatively, the rake surface 8 may include a planar portion or curved surface portion. The concept of "the planar portion" includes not only a flat surface in a strict sense, but also slight irregularities and curves as long as the rake surface 8 performs its own function. This is also true for the curved surface portion.

The flat surface 21 can at least partially function as a seating surface when the insert 1 is attached to the holder 10. In the present embodiment, from the viewpoint of ensuring a sufficient constraining force at an adequate position with respect to a cutting force generated during the cutting process, the region of the flat surface 21 is configured to be larger on a later-described lower flank surface 42b than on a later-described upper flank surface 42a, as shown in FIG. 1(b).

In the present embodiment, the upper surface 2 further includes the raised surface 9 which is located continuously with at least a part of the rake surface 8, and is inclined upward as the upper surface 2 separates from the upper major cutting edge 51, as shown in FIG. 1(a).

In an inner region of the upper major cutting edge 51, a first end part 81 of the rake surface 8, which is located away from the upper flat cutting edge 52, is continuous with the flat surface 21 with the raised surface 9 interposed therebetween, and a second end part 82 of the rake surface 8, which is located closer to the upper flat cutting edge 52, is directly connected to the flat surface 21. The upper surface 2 may further include a flat bottom between the rake surface 8 and the raised surface 9. On the other hand, in the present embodiment, an inner region 52A of the upper flat cutting edge 52 includes no upward inclined region, such as the raised surface 9, and a region corresponding to the rake surface 8 and the flat surface 21 are continuous with each other.

The through hole 6 extends between the upper surface 2 and the lower surface 3, and is provided for inserting a fastening screw and an attachment bolt when the insert 1 is attached to the holder 10. Thus, the insert 1 is attached to the holder 10 by inserting the screw into the through hole 6 extending between the upper surface 2 and the lower surface 3. This eliminates the need to increase the thickness of the insert 1 than necessary, compared to a so-called tangential insert, thereby reducing material costs. In the insert 1 of the present embodiment, the central axis S1 of the insert 1 passes through the center of the through hole 6, as shown in FIG. 1(a).

The side surface 4 is connected to each of the upper surface 2 and the lower surface 3, and includes the first side surface 41, the second side surface 42 and the third side surface 43 which are adjacent to each other in order, as described above. In the present embodiment, the side surface 4 further includes a corner side surface 45 which is located between the first side surface 41 and the second side surface 42, and is bent outward in a top view, as shown in FIG. 1. The individual side surfaces of the side surface 4 function at least partially as a constraining surface. That is, their respective constraining surfaces function as an attachment surface with respect to the holder 10 depending on an attachment direction to the holder 10. The individual side surfaces of the side surface 4 also function as a so-called flank surface for avoiding contact against the workpiece 100 during the cutting process.

As shown in FIG. 2(a), the first side surface 41 is disposed correspondingly to the upper major cutting edge 51, and is a substantially flat surface.

Figure 3A:
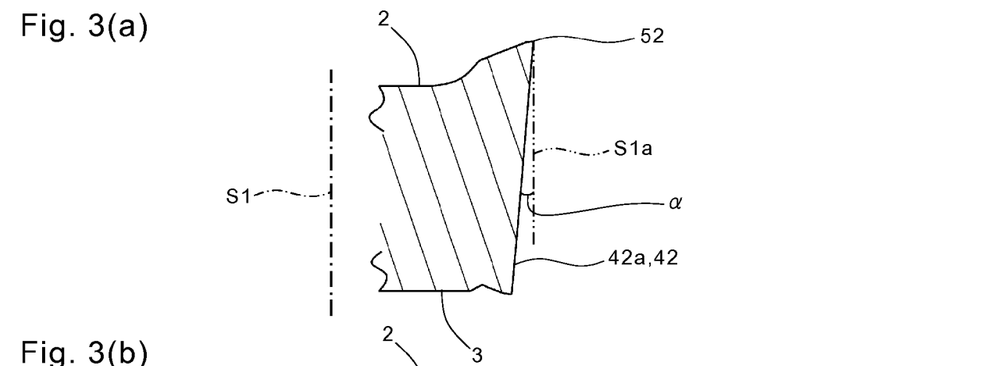
FIG. 3(a) is a partially enlarged sectional view showing the cutting insert in FIG. 2(b), taken along the line a-a in FIG. 2(b)
Figure 3B:
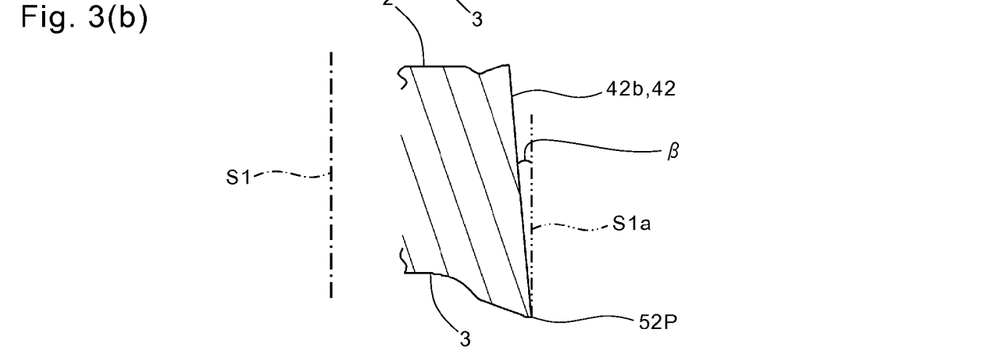
FIG. 3(b) is a partially enlarged sectional view thereof, taken along the line b-b in FIG. 2(b)

As shown in FIGS. 1(a) and 2(b), the second side surface 42 includes the upper flank surface 42a disposed correspondingly to the upper flat cutting edge 52, and the lower flank surface 42b disposed correspondingly to the lower flat cutting edge 52P. As shown in FIGS. 3(a) and 3(b), the upper flank surface 42a is closer to the central axis S1, and the lower flank surface 42b is separated from the central axis S1, as the upper and lower flank surfaces 42a and 42b respectively go from the upper surface 2 to the lower surface 3, in a side sectional view. Consequently, a relatively large clearance angle between the finished surface 102 of the workpiece 100 and each of the flank surfaces 42a and 42b of the second side surface 42 can be ensured without largely tilting toward the travel direction (forward) in the rotation direction of the holder 10 when the insert 1 is attached to the holder 10. Additionally, the second side surface 42 includes both of the two flank surfaces inclined in directions different from each other, namely, the upper flank surface 42a and the lower flank surface 42b. Therefore, the above-mentioned effect can also be produced when the insert 1 is attached to the holder 10 in a state in which either one of the upper surface 2 and the lower surface 3 of the insert 1 is oriented toward the travel direction in the rotation direction of the holder 10. On the other hand, a relatively large axial rake angle of the upper major cutting edge 51 can also be ensured because there is no need to largely tilt forward the insert 1 in order to ensure a relatively large clearance angle. In other words, the cutting resistance can be reduced while ensuring that the upper major cutting edge 51 of the insert 1 has a relatively small inclination. Therefore, it is not necessary to increase the thickness of the insert 1 any more than it is necessary to ensure a desired strength thereof. This produces an advantage of reducing material costs.

More specifically, as shown in FIGS. 3(a) and 3(b), the upper flank surface 42a is inclined at an inclination angle α with respect to the central axis S1 (reference line S1a), and the lower flank surface 42b is inclined at an inclination angle β with respect to the central axis S1 (reference line S1a) in a side sectional view. In the present embodiment, the inclination angle α is identical to the inclination angle β. Further in the present embodiment, the inclination angle α is smaller than the foregoing inclination angle X, and the inclination angle β is smaller than the foregoing inclination angle Y. In FIGS. 3(a) and 3(b), the reference line S1a indicates a straight line parallel to the central axis S1. Both of the upper flank surface 42a and the lower flank surface 42b have at least partially a straight line shape in a side sectional view. Hereat, the phrase "the side sectional view in the upper flank surface 42a" denotes a sectional view obtained by cutting the upper flank surface 42a by a plane orthogonal to the reference line L1 and parallel to the central axis S1. Similarly, the side sectional view in the lower flank surface 42b denotes a sectional view obtained by cutting the lower flank surface 42b by a plane orthogonal to the reference line L1 and parallel to the central axis S1.

Figure 3C:
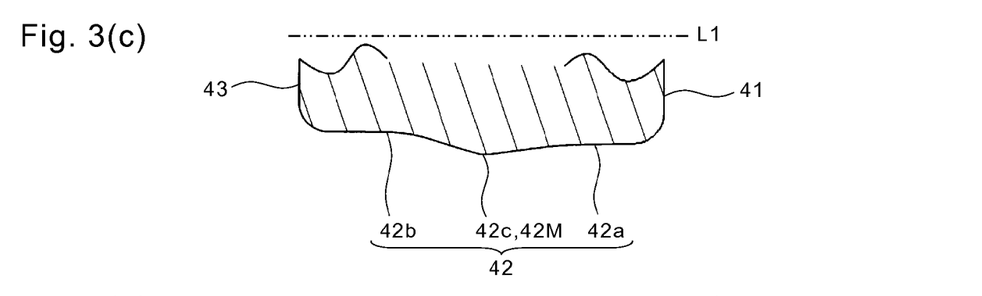
FIG. 3(c) is a partially enlarged sectional view thereof, taken along the line c-c in FIG. 2(b)
Figure 3D:
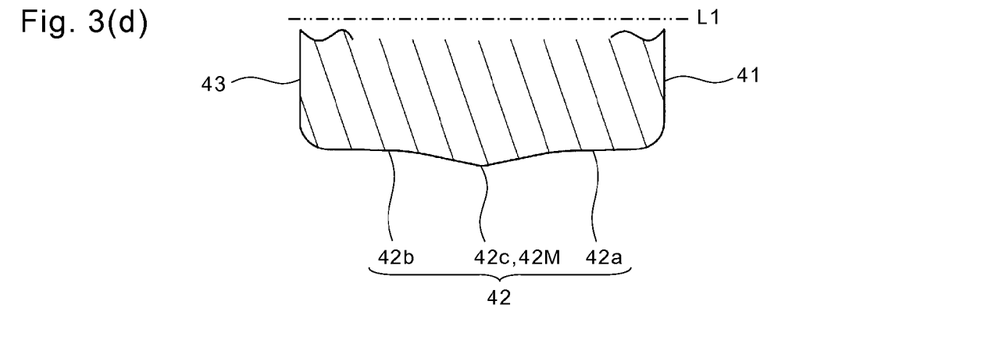
FIG. 3(d) is a partially enlarged sectional view thereof, taken along the line d-d in FIG. 2(b)

On the other hand, as shown in FIG. 3(d), in a cross section taken along line d-d passing through the center in the thickness direction of the insert 1, the upper flank surface 42a and the lower flank surface 42b have the same shape, and the second side surface 42 has a laterally symmetrical configuration as a whole. In contrast, as shown in FIG. 3(c), in a cross section taken along line c-c passing through closer to the upper surface 2 in the thickness direction of the insert 1, the upper flank surface 42a bulges outward compared to the lower flank surface 42b, and the second side surface 42 does not have the laterally symmetrical configuration as a whole.

The second side surface 42 is located between the upper flank surface 42a and the lower flank surface 42b, and further includes a boundary part 42c (middle part) bulging outward compared to the upper flank surface 42a and the lower flank surface 42b. In the present embodiment, the boundary part 42c extends from the upper surface 2 to the lower surface 3, as shown in FIG. 1(a). The boundary part 42c also has a straight line shape, and is parallel to the central axis S1, as shown in FIG. 2(b).

In the second side surface 42, a distance from the reference line L1, which passes through the central axis S1 and is orthogonal to a tangential line L2 at a middle point 51M of the upper major cutting edge 51, reaches its minimum value at an end portion closer to the first side surface 41, and reaches its maximum value at a middle part 42M in an upper sectional view. Both of the upper flank surface 42a and the lower flank surface 42b have an inwardly recessed concave portion. The middle part 42M of the second side surface 42 bulges outward in an upper sectional view. In the present embodiment, the middle part 42M is located at a middle point of the second side surface 42 in an upper sectional view.

As shown in FIGS. 3(c) and 3(d), the upper flank surface 42a has a straight line shaped portion located closer to the first side surface 41, and the lower flank surface 42b has a straight line shaped portion located closer to the third side surface 43 in an upper sectional view. Here, the upper sectional view in the second side surface 42 denotes a sectional view obtained by cutting the second side surface 42 by a plane perpendicular to the central axis S1.

The corner side surface 45 is located correspondingly to the corner cutting edge 53 as shown in FIG. 1. In the present embodiment, the corner side surface has a relatively gently curved shape.

<Cutting Tool>

Next, a cutting tool according to an embodiment of the present invention is described with reference to FIGS. 4 and 5.

Figure 4B:
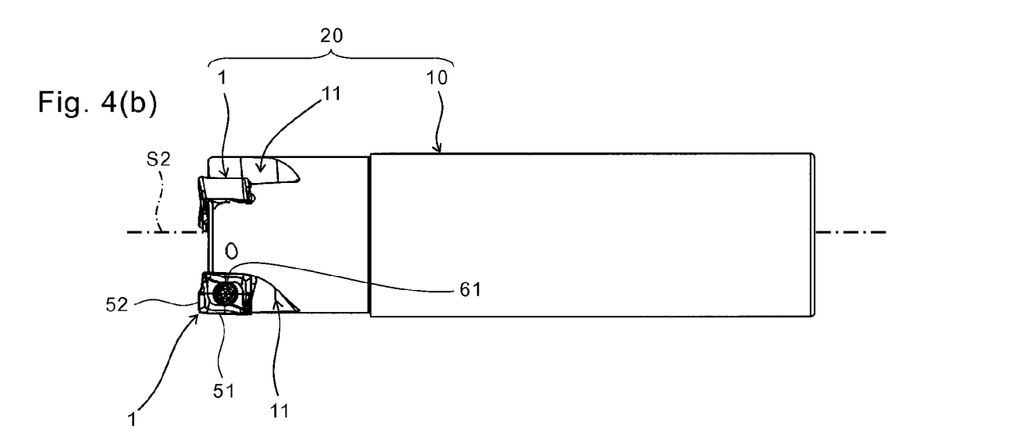
FIG. 4(b) is a side view thereof.
Figure 4C:
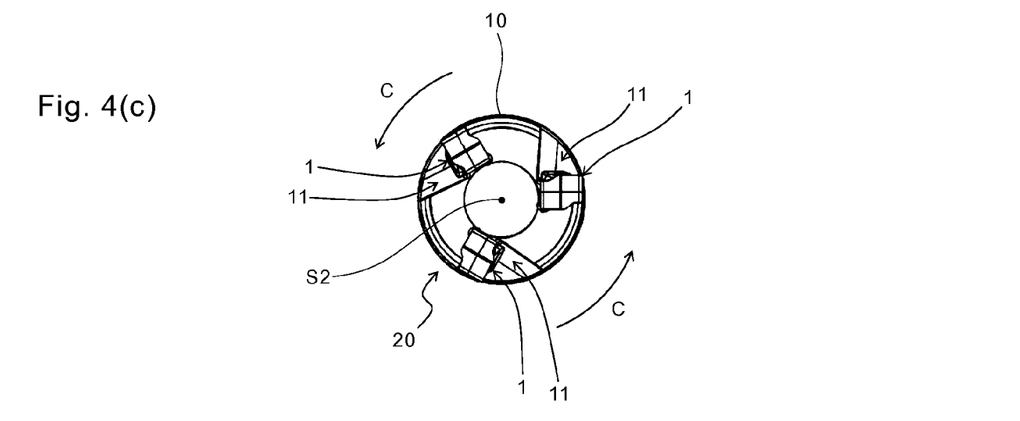
FIG. 4(c) is a front end view thereof.
Figure 5:
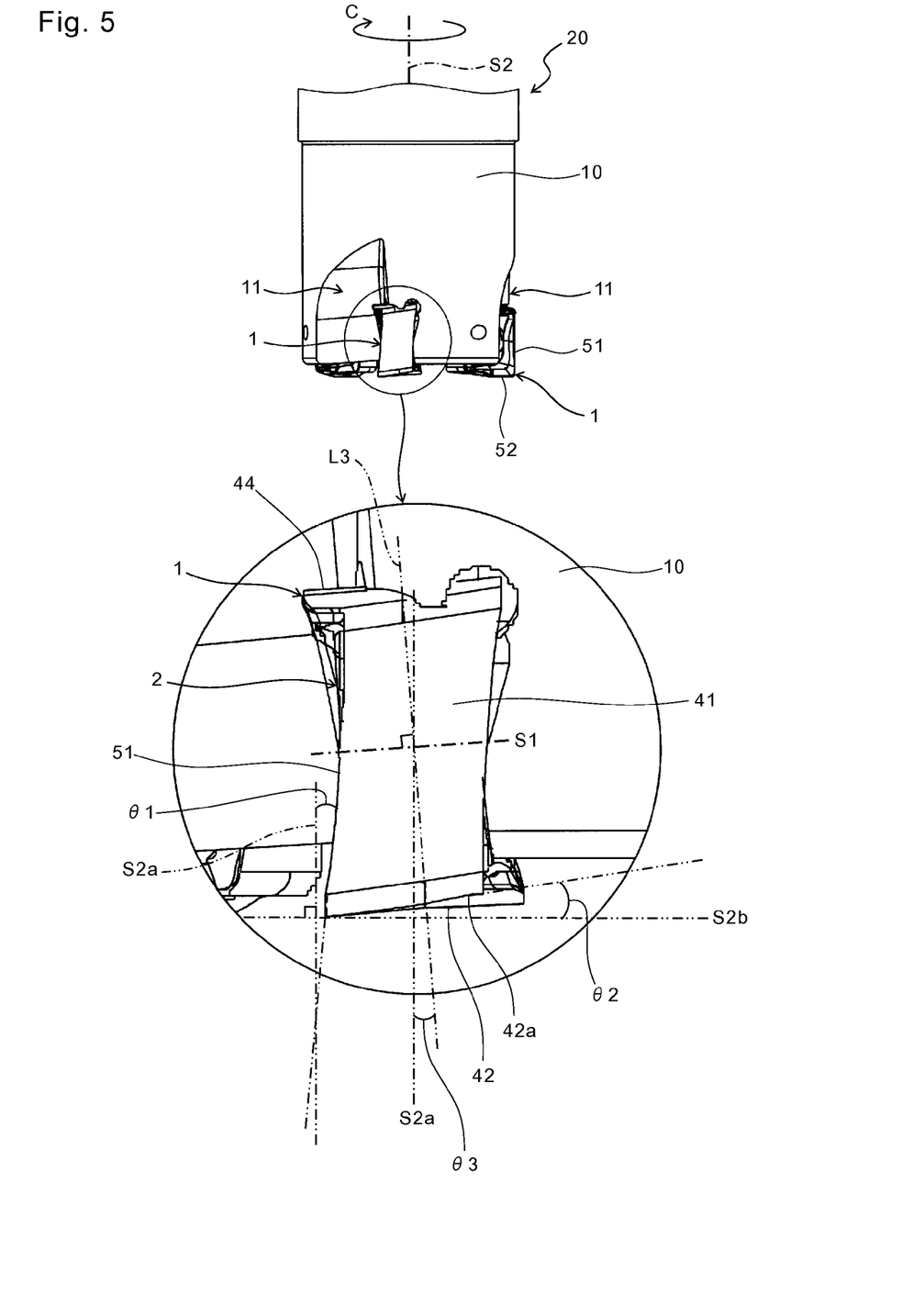
FIG. 5 is a partially enlarged side view showing a front end part of the cutting tool in FIG. 4.

The cutting tool 20 of the present embodiment is obtained by attaching has a plurality of the inserts 1 to peripheral front end portions of the holder 10, as shown in FIGS. 4 and 5.

As shown in FIG. 4, the holder 10 has, at the peripheral front end portions thereof, a plurality of insert pockets 11 spaced apart from each other in a circumferential direction. As shown in FIG. 4(c), these insert pockets 11 are portions obtained by cutting out the peripheral front end portions of the holder 10 into a substantially V-shape in a front end view. A plurality of attachment surfaces formed by the cut out operation function as attachment portions of the insert 1. These inserts 1 are respectively attached to these insert pockets one by one.

A method of attaching the insert 1, for example, includes inserting a fastening screw 61 into the through hole 6 of the insert 1; and screwing the front end of the fastening screw 61 into a screw hole formed in the attachment surface of the holder 10. As another method of attaching the insert 1, for example, a clamp structure may be employed.

The insert 1 is attached to the holder 10 in a state in which the upper surface 2 is oriented forward (toward the travel direction) in the rotation direction as indicated by an arrow C in FIGS. 4(c) and 5, and the first side surface 41 and the second side surface 42 are located closer to the peripheral front end of the holder 10. At this time, the insert 1 is attached to the holder 10 in a state in which the upper major cutting edge 51 is protruded beyond the periphery of the holder 10, and the upper flat cutting edge 52 is protruded beyond the front end of the holder 10. Further, some of the side surface 4 of the insert 1 which do not contribute to cutting action, namely, the third side surface 43 and the fourth side surface 44 are respectively contacted with contact surfaces (not shown) of the holder 10, and constrain each other. Thus, the cutting tool 20 is obtained by attaching the inserts 1 to the holder 10 in the foregoing manner, and the cutting process with respect to the workpiece 100 is performed by using the upper major cutting edge 51 and the upper flat cutting edge 52.

More specifically, in the present embodiment, the inserts 1 are attached to the holder 10 in the following state. That is, as shown in FIG. 5, the upper major cutting edge 51 is disposed to have a positive axial rake angle θ1, and the upper flank surface 42a of the second side surface 42 is disposed to have a positive actual clearance angle θ2. The former configuration allows for a reduction of the cutting resistance exerted on the upper major cutting edge 51. The latter configuration allows for a reduction of damage to the upper flank surface 42a, and improvement of surface roughness of the finished surface 102 of the workpiece 100. Thus, the inserts 1 of the present embodiment produce improvement of the degree of freedom of attachment to the holder 10, and excellent operation advantage based thereon.

Hereat, the axial rake angle θ1 denotes an inclination angle with respect to a straight line S2a parallel to the rotation axis S2 of the holder 10, and the actual clearance angle θ2 denotes an inclination angle with respect to a straight line S2b perpendicular to the rotation axis S2 of the holder 10. As a specific example, the axial rake angle θ1 of the upper major cutting edge 51 is preferably approximately 5 to 15 degrees at an end portion closer to the upper flat cutting edge 52. The upper flank surface 42a of the second side surface 42 preferably has an actual clearance angle θ2 of approximately 5 to 15 degrees.

In the present embodiment, in a side view of the cutting tool 20 as shown in FIG. 5, the insert 1 is set so that a part of the insert 1 closer to the rear end portion of the holder 10 is inclined forward at an inclination angle θ3 in the rotation direction of the holder 10 with reference to the rotation axis S2 (straight line S2a) of the holder 10. The inclination angle θ3 is preferably, for example, approximately 3 to 10 degrees. Having the inclination angle θ3 further increases the actual clearance angle θ2 of the upper flank surface 42a of the second side surface 42, thereby further reducing contact between the insert 1 and the workpiece 100 during the cutting process. Hereat, the inclination angle θ3 denotes an angle formed by the rotation axis S2 (straight line S2a) of the holder 10 and the straight line L3 perpendicular to the central axis S1 of the insert 1. The straight line L3 is a straight line passing through the middle part of the fourth side surface 44 of the insert 1.

When the insert 1 is attached to the holder 10 in the foregoing manner, in a side view of the insert 1 attached to the holder 10 as shown in FIG. 5, the inclination angle (corresponding to the actual clearance angle) θ2 of the upper flank surface 42a with respect to the straight line S2b perpendicular to the rotation axis S2 is preferably larger than the inclination angle θ3 (forward inclination angle) of the insert 1 with respect to the straight line S2a parallel to the rotation axis S2. This allows for a reduction of cutting resistance exerted on the upper major cutting edge 51, and a reduction of damage to the upper flank surface 42a, and an improvement of surface roughness of the finished surface 102 of the workpiece 100.

The upper flat cutting edge 52 is preferably disposed to have an inclination of approximately 0 to 0.5 degrees with respect to the straight line S2b perpendicular to the rotation axis S2 of the holder 10 as the upper flat cutting edge 52 goes to the depth direction of FIG. 5. A non-cutting region that is not substantially used as the upper flat cutting edge 52 in the intersection of the upper surface 2 and the second side surface 42, namely, a region of the foregoing intersection, which extends from the middle part thereof to an end portion opposing the upper corner cutting edge 53, is preferably disposed to have an inclination of approximately 0 to 2 degrees with respect to the straight line S2b perpendicular to the rotation axis S2 of the holder 10. With this configuration, the non-cutting region is away from the finished surface 102 of the workpiece 100 during the cutting process, and therefore their mutual contact can be reduced to suppress damage to the non-cutting region.

A radial rake angle of the insert 1 with respect to the holder 10 is preferably set at approximately −5 to −40 degrees. In the insert 1 allowing both of the upper surface 2 and the lower surface 3 to perform cutting as in the case of the present embodiment, when the upper surface 2 is used for cutting, the radial rake angle is preferably set at a value larger than −40 degrees from the viewpoint of reducing interference of the intersection of the lower surface 3 and the side surface of the insert 1 with a machined wall surface of the workpiece 100. The radial rake angle is preferably set at a value smaller than −5 degrees from the viewpoint of reducing cutting edge strength deterioration by relatively decreasing the actual clearance angle θ2 of the upper flank surface 42a.

The cutting of the workpiece 100 by the upper major cutting edge 51 and the upper flat cutting edge 52 is carried out by rotating the cutting tool 20 having the foregoing configuration in a direction of arrow C around the rotation axis S2 of the holder 10.

<Method of Manufacturing Machined Product>

Next, a method of manufacturing a machined product according to an embodiment of the present invention is described below with reference to FIG. 6.

The cutting tool 20 having the plurality of cutting inserts 1 attached to the holder 10 in the foregoing manner is prepared before starting the cutting process of the workpiece 100. As shown in FIG. 6, the cutting tool 20 is disposed so that the rotation axis S2 of the holder 10 is substantially parallel to a surface of the workpiece 100 which is cut into a wall surface 101.

Subsequently, as shown in FIG. 6(a), an appropriate depth of cut is set by fixing the workpiece 100 to a bed or the like of a milling machine (not shown), and by moving the cutting tool 20 in a direction of arrow D.

Figure 6B:
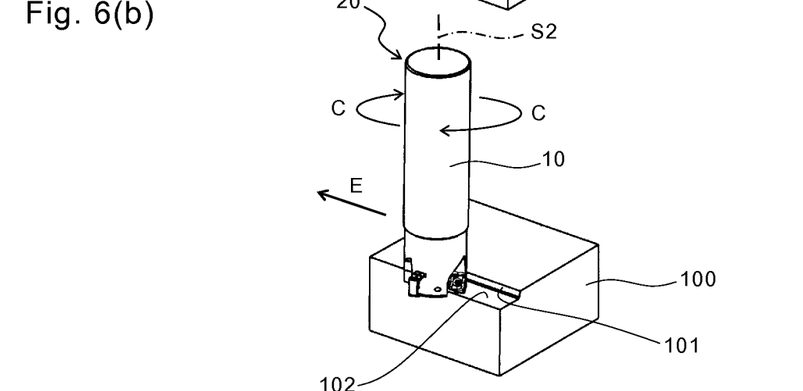

Subsequently, as shown in FIG. 6(b), the cutting tool 20 is fed (moved) in a direction of arrow E while rotating the cutting tool 20 in a direction of arrow C around the rotation axis S2 of the holder 10. Thereby, the upper major cutting edge 51 is contacted against an arcuate portion of the workpiece 100 located ahead in the feed direction so as to cut a region according to the depth of cut. At that time, an arcuate line (cutting trace) remains on the surface (bottom surface) of the workpiece 100 when the plurality of inserts 1 enter the cutting region and perform cutting in order. The arcuate line is cut by the upper flat cutting edge 52, thus producing a smooth surface.

Figure 6C:
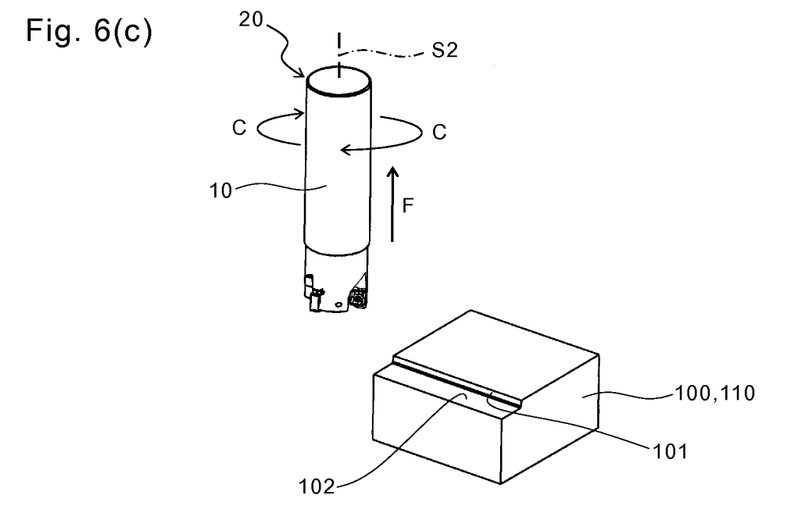

Subsequently, as shown in FIG. 6(c), the cutting tool 20 is separated from the workpiece 100 by pulling up the cutting tool 20 in a direction of arrow F after the cutting tool 20 passes through the workpiece 100.

A machined product 110 having the wall surface 101 and the finished surface 102 is manufactured through the foregoing manufacturing steps. That is, in the method of manufacturing the machined product according to the present embodiment, the machined produce 110 is manufactured by sequentially performing the step of cutting the workpiece 100 by bringing the individual inserts 1 into contact against the workpiece 100 by rotating the cutting tool 20; and the step of separating the cutting tool 20 from the workpiece 100.

In the present embodiment, for example, carbon steel, alloy steel, cast iron, mold steel, stainless steel or aluminum can be used as the material of the workpiece 100. Alternatively, titanium alloy having a relatively small elastic modulus, or the like may be used. According to the cutting tool 20 of the present embodiment, a relatively large clearance angle between the second side surface 42 and the finished surface 102 of the workpiece 100 can be ensured without largely tilting forward the inserts 1 toward the travel direction in the rotation direction of the holder 10 when the inserts 1 are attached to the holder 10. Therefore, even when cutting the workpiece 100 whose elastic modulus is relatively small, the space ensured between the workpiece 100 and the flank surfaces 42a and 42b can reduce contact therebetween. This improves the surface roughness of the finished surface 102 of the workpiece 100, and also improves tool life owing to wear reduction of the flank surfaces 42a and 42b.

When the cutting process is continuously performed, it is required to repeat the foregoing steps, as shown in FIGS. 6(b) and 6(c), by bringing the upper cutting edge 5 of the cutting tool 20 into contact against the same portion or different portions of the workpiece 100, while holding the rotation of the cutting tool 20.

When the upper cutting edge 5 being used is worn, the cutting may be performed using the other upper cutting edge 5 not yet used or the lower cutting edge 5P by rotating the insert 1 180 degrees around the central axis S1, or by reversing the upper surface 2 and the lower surface 3.

It is to be understood that the present invention is not limited to the foregoing embodiments, and various changes and modifications can be made therein without departing from the spirit or scope of the present invention.

For example, in the foregoing embodiment, the shape of the insert 1 in a top view is the substantially quadrangular shape (substantially rectangular shape). Alternatively, a substantially polygonal shape, such as triangle, pentagon, hexagon, or octagon, may be employed. Among others, a polygonal shape having an even number of sides is preferred from the viewpoint of effectively arranging the upper and lower major cutting edges and the upper and lower flat cutting edges.

In the insert 1 according to the foregoing embodiment, the upper major cutting edge 51 has the gentle outward convex-shaped curve as the upper major cutting edge 51 separates from the upper flat cutting edge 52 in the top view, as shown in FIG. 1(b), and the upper major cutting edge 51 is also inclined in the gentle downward concave-shaped curve as the upper major cutting edge 51 separates from the upper flat cutting edge 52 in a side view, as shown in FIG. 2(a). In an alternative configuration, the upper major cutting edge 51 may have a gentle outwardly concave-shaped curve as the upper major cutting edge 51 separates from the upper flat cutting edge 52 in a top view, and the upper major cutting edge 51 may be also inclined in a gentle upward convex-shaped curve as the upper major cutting edge 51 separates from the upper flat cutting edge 52 in a side view. In this configuration, when the upper cutting edge 5 is contacted against the workpiece 100, it is easy to firstly bring a planar portion of the workpiece 100 and then other portions thereof in order. This reduces fracture of the upper corner cutting edge 53 or the like, and also reduces machine vibration. Specifically, the upper major cutting edge 51 is firstly brought into contact against the end face of the workpiece 100, not allowing the upper corner cutting edge 53 to be firstly contacted against the workpiece 100. This can reduce impact and also reduce fracture of the upper corner cutting edge 53 particularly under conditions of high-feed machining and high-hardness workpiece machining, consequently reducing deterioration of the machined surface of the workpiece 100.

As another example, the upper cutting edge 51 may have a straight line shape in a top view and have a straight line shape in a top view from the viewpoint of ensuring the constraining surface for attaching the insert 1 to the holder 10 as wide as possible.

In the foregoing embodiment, the boundary part 42c has the straight line shape and is parallel to the central axis S1. In an alternative configuration, the boundary part 42c approaches the first side surface 41 from the third side surface 43 as the boundary part 42c goes from the upper surface 2 to the lower surface 3. This configuration ensures a longer length of the upper flat cutting edge 52 and a longer length of the lower flat cutting edge 52P than the foregoing embodiment, provided that the second side surface 42 has the same width. In other words, the width of the second side surface 42 can be set at a narrow width when the length of the upper flat cutting edge 52 and the length of the lower flat cutting edge 52P are ensured. As another modification, the boundary part 42c may have a concave-shape as going from the upper surface 2 to the lower surface 3 in a top view.

In the foregoing embodiment, the cutting tool 20 being rotated is fed to the workpiece 100. Alternatively, the cutting process may be performed by rotating the cutting tool 20 at a predetermined position, and by subjecting the workpiece 100 to feed-travel with respect to the cutting tool 20.

In the foregoing embodiment, the milling machine is exemplified as a machine tool. Alternatively, the cutting process may be performed by bringing the cutting tool 20 not being rotated and the workpiece 100 being rotated into contact with each other, as in the case of a lathe.

The invention claimed is:

1. A cutting insert, comprising:
    an upper surface;
        a lower surface;
        a side surface which is connected to each of the upper surface and the lower surface and comprises a first side surface, a second side surface and a third side surface being adjacent to each other in order;
        an upper cutting edge comprising an upper major cutting edge located at an intersection of the upper surface and the first side surface, and an upper flat cutting edge located closer to the upper major cutting edge in an intersection of the upper surface and the second side surface; and
        a lower cutting edge comprising a lower major cutting edge located at an intersection of the lower surface and the third side surface, and a lower flat cutting edge located closer to the lower major cutting edge in an intersection of the lower surface and the second side surface, wherein
        the second side surface comprises an upper flank surface connected to the upper flat cutting edge, and a lower flank surface connected to the lower flat cutting edge, and
        as going from the upper surface to the lower surface, the upper flank surface is closer to a central axis extending between the upper surface and the lower surface and the lower flank surface is separated from the central axis in a side sectional view.

2. The cutting insert according to claim 1, wherein
    the upper flank surface is inclined at an inclination angle $\alpha$ with respect to the central axis in a side sectional view,
    the upper major cutting edge is inclined downward at an inclination angle X as the upper major cutting edge separates from the upper flat cutting edge in a side view of the first side surface, and the inclination α is smaller than the inclination angle X.

3. The cutting insert according to claim 1, wherein
the lower flank surface is inclined at an inclination angle β with respect to the central axis in a side sectional view,
the lower major cutting edge is inclined upward at an inclination angle Y as the lower major cutting edge separates from the lower flat cutting edge in a side view of the first side surface, and
the inclination β is smaller than the inclination angle Y.

4. The cutting insert according to claim 1, wherein
the upper flank surface is inclined at an inclination angle α with respect to the central axis in a side sectional view,
the lower flank surface is inclined at an inclination angle β with respect to the central axis in a side sectional view, and
the inclination angle α is identical to the inclination angle β.

5. The cutting insert according to claim 1, wherein the second side surface further comprises a boundary part located between the upper flank surface and the lower flank surface.

6. The cutting insert according to claim 5, wherein the boundary part bulges outward compared to the upper flank surface and the lower flank surface in a top view.

7. The cutting insert according to claim 5, wherein the boundary part is located from the upper surface to the lower surface.

8. The cutting insert according to claim 5, wherein the boundary part has a straight line shape in a side view.

9. The cutting insert according to claim 5, wherein the boundary part approaches the first side surface from the third side surface as the boundary part goes from the upper surface to the lower surface.

10. The cutting insert according to claim 5, wherein the boundary part has a concave shape inward as going from the upper surface to the lower surface.

11. The cutting insert according to claim 1, wherein the upper flat cutting edge comprises a region where a distance from a reference line is longer as the upper flat cutting edge goes from the first side surface to the third side surface in a top view, the reference line passing through the central axis and being orthogonal to a tangential line at a middle point of the upper major cutting edge.

12. The cutting insert according to claim 1, wherein the upper flat cutting edge has a maximum distance from a reference line at a middle region of the intersection of the upper surface and the second side surface in a top view, the reference line passing through the central axis and being orthogonal to a tangential line at a middle point of the upper major cutting edge.

13. The cutting insert according to claim 1, wherein the upper cutting edge further comprises an upper corner cutting edge, the upper corner cutting edge being located between the upper major cutting edge and the upper flat cutting edge and having an outward convex curved shape in a top view.

14. The cutting insert according to claim 1, wherein a shape of the cutting insert in a top view is a rectangular shape whose long side is an outer edge of the cutting insert closer to the first side surface and whose short side is an outer edge of the cutting insert closer to the second side surface.

15. The cutting insert according to claim 1, further comprising a through hole extending between the upper surface and the lower surface.

16. A cutting tool, comprising:
a cutting insert according to claim 1; and
a holder configured to attach the cutting insert thereto, wherein
an inclination angle θ2 between a straight line perpendicular to a rotation axis of the holder and the upper flank surface is larger than an inclination angle θ3 between the rotation axis of the holder and a straight line perpendicular to the central axis of the cutting insert in a side view.

17. The cutting tool according to claim 16, wherein the cutting insert is attached to the holder in a state that the upper major cutting edge has a positive axial rake angle with respect to the rotation axis of the holder.

18. A method of manufacturing a machined product, comprising:
rotating a cutting tool according to claim 16;
bringing the upper cutting edge of the cutting tool being rotated into contact against a workpiece; and
separating the cutting tool from the workpiece.

* * * * *